US012212047B2

(12) United States Patent
Samardzija et al.

(10) Patent No.: US 12,212,047 B2
(45) Date of Patent: Jan. 28, 2025

(54) AUTOMATICALLY RECONFIGURABLE ANTENNA CIRCUIT FOR ENABLING OPERATION WITHIN MULTIPLE FREQUENCY BANDS

(71) Applicant: Plume Design, Inc., Palo Alto, CA (US)

(72) Inventors: Miroslav Samardzija, Mountain View, CA (US); Eden Cheng, Taipei (TW); Robert Huang, Taipei (TW); Liem Hieu Dinh Vo, San Jose, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 560 days.

(21) Appl. No.: 17/391,531

(22) Filed: Aug. 2, 2021

(65) Prior Publication Data

US 2023/0037029 A1 Feb. 2, 2023

(51) Int. Cl.

| | |
|---|---|
| ***H01Q 1/08*** | (2006.01) |
| ***H01Q 1/27*** | (2006.01) |
| ***H01Q 5/48*** | (2015.01) |
| ***H01Q 7/00*** | (2006.01) |

(52) U.S. Cl.

CPC ............. *H01Q 1/273* (2013.01); *H01Q 1/085* (2013.01); *H01Q 5/48* (2015.01); *H01Q 7/00* (2013.01)

(58) Field of Classification Search

CPC .......... H01Q 1/273; H01Q 1/085; H01Q 5/48; H01Q 7/00; H01Q 1/2291; H01Q 5/314; H01Q 9/26

See application file for complete search history.

(56) References Cited

U.S. PATENT DOCUMENTS

| | | | | |
|---|---|---|---|---|
| 6,853,197 | B1 | 2/2005 | McFarland et al. | |
| 6,961,545 | B2 | 11/2005 | Tehrani et al. | |
| 7,245,882 | B1 | 7/2007 | McFarland | |
| 7,245,893 | B1 | 7/2007 | Husted et al. | |
| 7,251,459 | B2 | 7/2007 | McFarland et al. | |
| 9,136,937 | B1 | 9/2015 | Cheng et al. | |
| 9,160,584 | B1 | 10/2015 | Kavousian et al. | |
| 10,855,335 | B1 * | 12/2020 | Napoles | H01Q 1/273 |
| 11,026,177 | B1 * | 6/2021 | Chung | H04W 52/0277 |
| 2013/0090057 | A1 | 4/2013 | Green et al. | |
| 2013/0293424 | A1 | 11/2013 | Zhu et al. | |
| 2014/0009344 | A1 | 1/2014 | Zhu et al. | |
| 2014/0009355 | A1 | 1/2014 | Samardzija et al. | |
| 2014/0112511 | A1 | 4/2014 | Corbin et al. | |
| 2014/0226572 | A1 | 8/2014 | Thota et al. | |

(Continued)

*Primary Examiner* — Hai V Tran
*Assistant Examiner* — Michael M Bouizza
(74) *Attorney, Agent, or Firm* — Nicholas Martin; Greenberg Traurig, LLP

(57) ABSTRACT

A wearable ring includes an inner surface and an outer surface; a first antenna component and a second antenna component, each disposed between the inner surface and the outer surface; a first electrical circuit connecting a first end portion of the first antenna component with a first end portion of the second antenna component; and a second electrical circuit connecting a second end portion of the first antenna component with a second end portion of the second antenna component, and wherein, based on configuration of the first electrical circuit and the second electrical circuit, the first antenna component and second antenna component are configured to operate in a given frequency band.

14 Claims, 13 Drawing Sheets

(56) References Cited

U.S. PATENT DOCUMENTS

| | | | | |
|---|---|---|---|---|
| 2014/0340265 | A1 | 11/2014 | Vazquez et al. | |
| 2015/0099474 | A1 | 4/2015 | Yarga et al. | |
| 2015/0109167 | A1 | 4/2015 | Yarga et al. | |
| 2015/0195836 | A1 | 7/2015 | Malkin et al. | |
| 2015/0302976 | A1 | 10/2015 | Chang et al. | |
| 2015/0303568 | A1 | 10/2015 | Yarga et al. | |
| 2015/0311960 | A1 | 10/2015 | Samardzija et al. | |
| 2016/0056526 | A1 | 2/2016 | Li et al. | |
| 2016/0336643 | A1 | 11/2016 | Pascolini et al. | |
| 2017/0214422 | A1* | 7/2017 | Na | H01Q 7/00 |
| 2018/0048056 | A1* | 2/2018 | Jow | H01Q 1/273 |
| 2020/0233452 | A1* | 7/2020 | von Badinski | G06F 3/147 |
| 2020/0266529 | A1* | 8/2020 | Moussakhani | H01Q 1/273 |
| 2022/0019991 | A1* | 1/2022 | Rezayee | H01Q 1/273 |
| 2022/0255360 | A1* | 8/2022 | Sengupta | H01Q 9/0421 |

* cited by examiner

AUTOMATICALLY RECONFIGURABLE ANTENNA CIRCUIT FOR ENABLING OPERATION WITHIN MULTIPLE FREQUENCY BANDS

TECHNICAL FIELD

The present disclosure generally relates to antennas and antenna circuits. More particularly, the present disclosure relates to incorporating antenna components in a wearable device, such as a ring, and configuring antenna circuitry to enable communication within multiple different frequency bands.

BACKGROUND

For the sale of goods, a Point of Sale (POS) device is often used for receiving payment from a customer. For example, various POS devices may include cash registers, credit/debit card machines, and other traditional fixed devices. Also, newer technologies for POS devices may involve the use of mobile technology, such as a customer mobile device that may be configured to run certain merchandise purchasing applications.

Recently, "smart rings" have been developed and have become a popular consumer electronic device. From the outside, smart rings appear to be regular decorative rings. However, these smart rings may include wireless capabilities that allow them to pair with corresponding POS device for making payments.

Also, some smart rings may instead be configured to pair with a smart phone. The wireless capabilities of these various smart rings require that antennas be incorporated into the ring. However, since some smart rings may be made of metal, it can be challenging to design and integrate antennas into the metallic rings. Typical designs on the market use chip antennas which require dedicated antenna volume that may already be scarce. Normally, these chip antennas have low performance as they typically rely on ground currents of very small Printed Circuit Board (PCB). Therefore, there is a need in the field of POS devices and smart rings to improve wireless communication with external devices.

BRIEF SUMMARY

The present disclosure is directed to antenna systems and circuitry, which may be embedded in a wearable device, such as a ring that may be worn on a wearer's finger. According to one implementation, an antenna system includes a first antenna component having a first end portion and a second end portion a second antenna component also having a first end portion and a second end portion. The antenna system also includes a first electrical circuit connecting the first end portion of the first antenna component with the first end portion of the second antenna component and a second electrical circuit connecting the second end portion of the first antenna component with the second end portion of the second antenna component. In response to the first and second electrical circuits being configured in a first state, the first antenna component and second antenna component are configured to operate within a first frequency band. In response to the first and second electrical circuits being configured in a second state, the first antenna component and second antenna component are configured to operate within a second frequency band.

According to various embodiments, the above-mentioned antenna system may include additional components and/or features. For example, in response to the first and second electrical circuits being configured in the first state, the first antenna component and second antenna component may be configured in a dipole antenna arrangement. In response to the first and second electrical circuits being configured in the second state, the first antenna component and second antenna component may be configured in a loop antenna arrangement. Also, the antenna system may be incorporated in a wearable device, such as a ring configured to be worn on a finger of a wearer, a toe, etc. The ring, for example, may include an outer shell having characteristics configured for parasitic reflection of transmission signals.

The antenna system may further be defined whereby operation within the first frequency band may enable pairing with a Point of Sale (POS) device and operation within the second frequency band may enable pairing with a smart phone. Also, the antenna system may further include a battery configured to power one or more of the first and second electrical circuits. The battery may include an outer metal casing that forms at least a portion of the first antenna component. The antenna system may also include a Near-Field Communication (NFC) charger configured to create a magnetic field for charging the battery.

As referenced above, the first frequency band may include one or more channels in a Bluetooth frequency band ranging from about 2.4000 GHz to about 2.4835 GHz and the second frequency band may include one or more channels in an NFC frequency band ranging from about 12.66 MHz to about 14.46 MHz. The second antenna component mentioned above may include at least a flexible printed circuit board on which at least a portion of the second electrical circuit resides. The first electrical circuit may include a choke inductor that behaves like an open circuit when operating within the first frequency band and behaves like a short circuit when operating within the second frequency band. The second electrical circuit may include blocking elements, matching circuit elements, and transceiver elements to enable operation within either the first frequency band or second frequency band. The antenna system may further include one or more conductive strips and/or one or more ferrite strips attached to one or more of the first and second antenna component.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
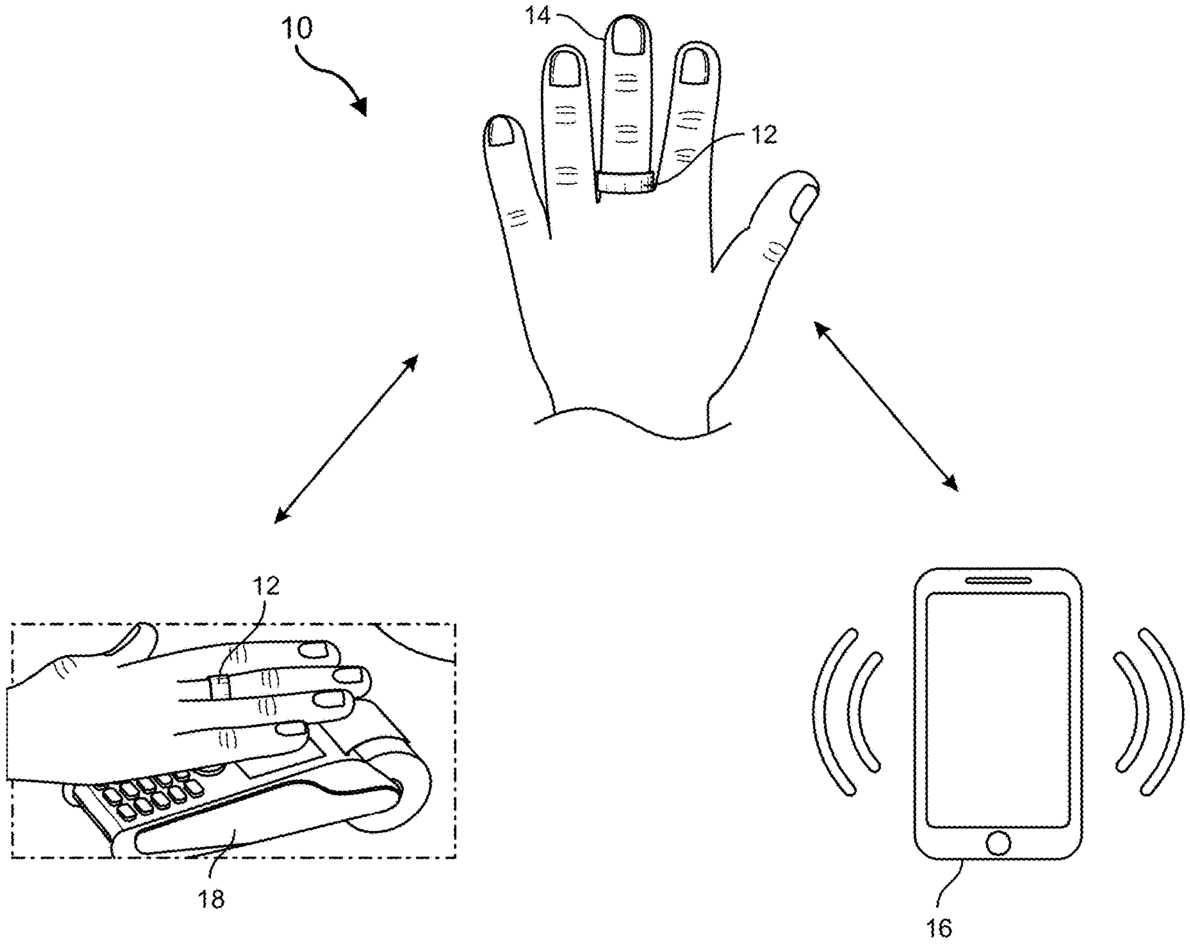
FIG. 1 is a diagram illustrating a system where a smart ring can wirelessly communicate with a POS machine and a mobile device, according to various embodiments of the present disclosure.

FIG. 1 is a diagram illustrating a system 10 in which a smart ring 12 can wirelessly communicate at short range to various devices. For example, the smart ring 12 may be worn on a finger 14 of a user (e.g., customer). When positioned near a mobile device 16, the smart ring 12 and mobile device 16 may be configured to operate within a first frequency band (e.g., Bluetooth frequencies) to enable communication therebetween. When positioned close to a Point-of-Sale (POS) machine 18, the smart ring 12 and POS machine 18 may be configured to operate within a second frequency band (e.g., Near Field Communication (NFC) frequencies) to enable communication therebetween.

Conventional smart rings normally do not allow operation within two separate frequency bands. However, according to the various embodiments of the present disclosure, various antenna components of the smart ring 12 include specific physical characteristics and electrical circuitry that enable operation at two different frequency band. This allows the smart ring 12 to pair with the mobile device 16 to enable operation within the first frequency band (e.g., Bluetooth) while also allowing the smart ring 12 to pair with the POS machine 18 to enable operation within the second frequency band (e.g., NFC). In particular, antenna portions, as described below, may be configured to be fully embedded in a normal-sized ring. These antenna portions may include, for example, the electrically conductive battery casing and also a conductive trace or film on a Flexible Printed Circuit (FPC) or other suitable flexible board that can be embedded within the normal-sized ring. By using these components, which may already be needed for wireless communication, it may be possible to minimize the extra number of parts and circuitry to conserve space within the outer shell of the smart ring 12.

Figure 2:
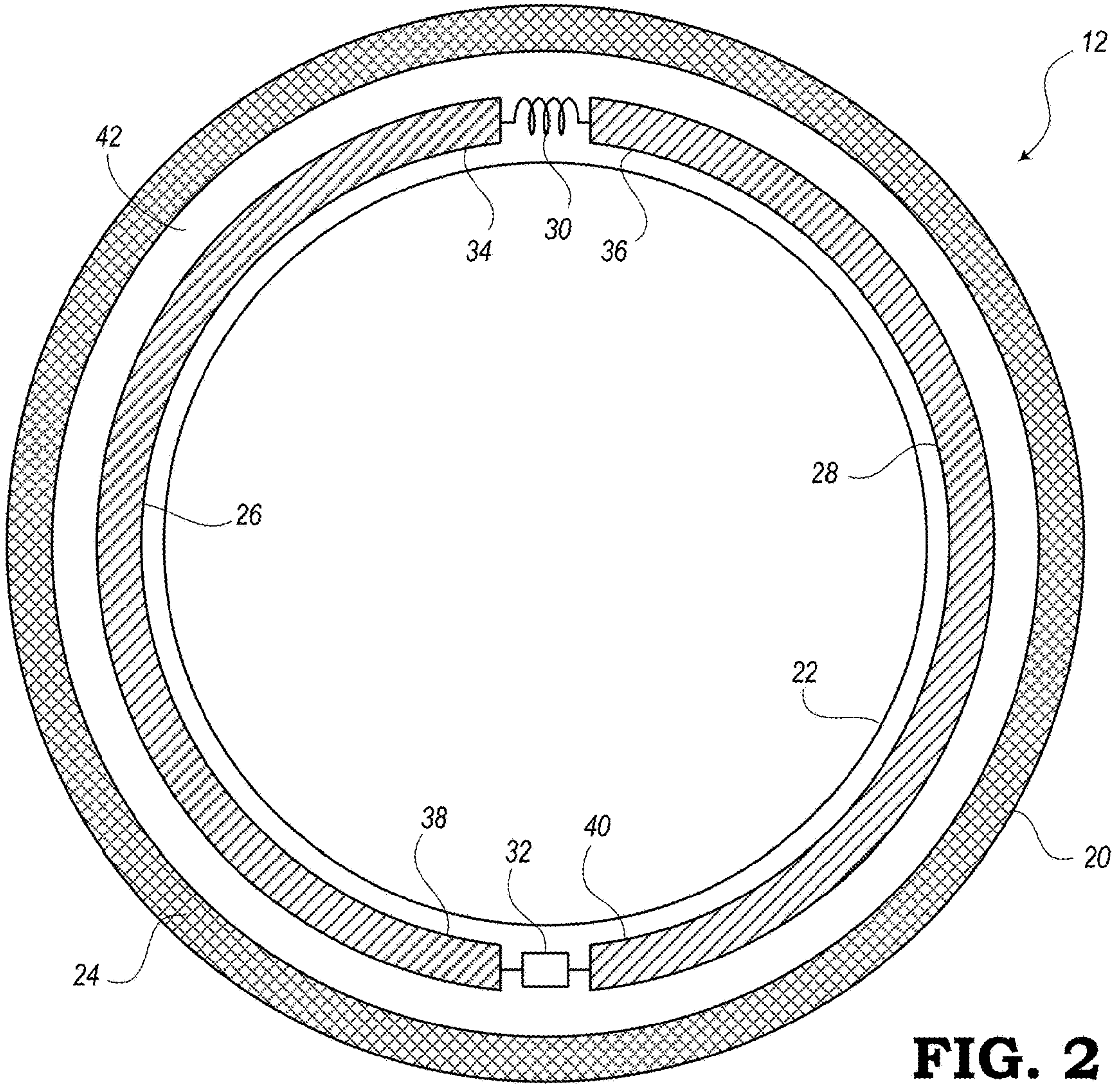
FIG. 2 is a diagram illustrating a cross-sectional view of a smart ring, according to various embodiments of the present disclosure.

FIG. 2 shows a cross-sectional view of an embodiment of the smart ring 12. The smart ring 12 includes an outer surface 20 that may usually be visible when it is worn on a user's finger 14 (not shown in FIG. 2) and an inner surface 22 that may usually be in contact with the user's finger 14. An outer portion of the smart ring 12 may include a metallic layer 24, which may include the outer surface 20 in some embodiments.

Also, the smart ring 12 includes a first antenna component 26 and a second antenna component 28. The first and second antenna components 26, 28, in combination, may form a ring or tube having a relatively narrow width (e.g., measured from an outer surface to an inner surface as shown in FIG. 2) and a relatively narrow depth (e.g., measured into the page). In some embodiments, the depth of each of the first and second antenna components 26, 28 may have a dimension that is greater than its width.

Furthermore, the smart ring 12 includes a first electrical circuit 30 and a second electrical circuit 32. The first electrical circuit 30 is configured to electrically connect a first end portion 34 of the first antenna component 26 with a first end portion 36 of the second antenna component 28. Also, the second electrical circuit 32 is configured to electrically connect a second end portion 38 of the first antenna component 26 with a second end portion 40 of the second antenna component 28.

Figure 3:
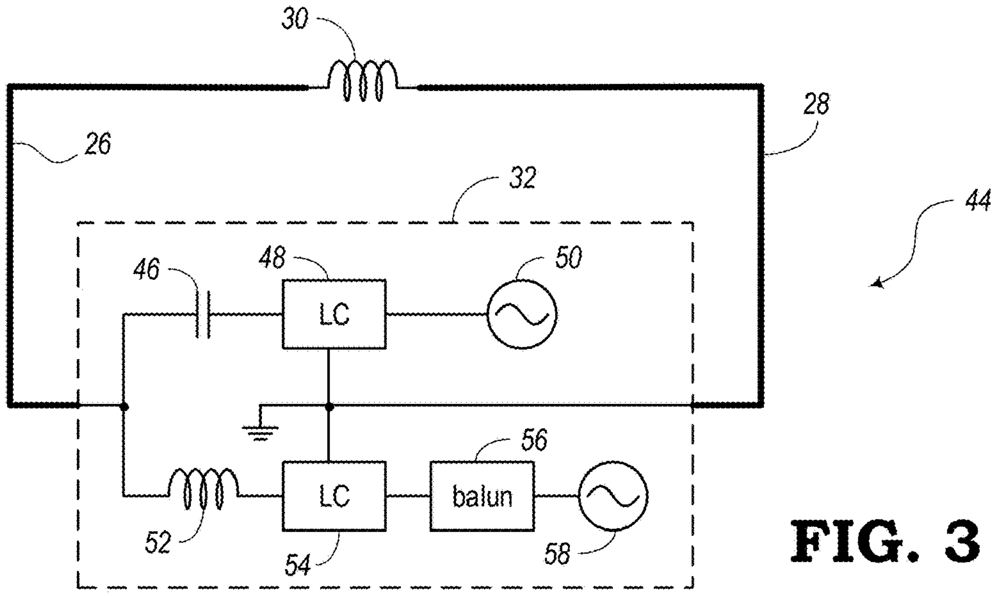
FIG. 3 is a schematic diagram illustrating electrical circuitry of the smart ring of FIG. 2, according to various embodiments.

FIG. 3 is a schematic diagram illustrating an embodiment of an antenna circuit 44. In this embodiment, the antenna circuit 44 includes the first electrical circuit 30, the second electrical circuit 32, and the first and second antenna components 26, 28 connected between the first and second electrical circuits 30, 32. According to some embodiments, the first electrical circuit 30 may simply include an inductor configured to act like an open circuit at higher frequencies (e.g., Bluetooth frequencies) and act like a short circuit at lower frequencies (e.g., NFC frequencies).

As shown in the embodiment of FIG. 3, the second electrical circuit 32 includes a first set of components 46, 48, 50 configured for operation at the higher frequency range (e.g., Bluetooth) and a second set of components 52, 54, 56, 58 configured for operation at the lower frequency range (e.g., NFC). The first set of components includes a frequency blocking device 46 (e.g., series-connected capacitor), a higher-frequency matching circuit 48 (e.g., a combination of series-connected and shunt-connected inductors and capacitors), and a higher-frequency radio transceiver 50. The second set of components includes a higher-frequency choke or choke inductor 52 (e.g., a series-connected inductor or ferrite bead), a lower-frequency matching circuit (e.g., combination of series-connected and shunt-connected capacitors), a lower-frequency balun 56, and a lower-frequency radio transceiver 58. The matching circuits 48, 54 may be connected to ground and the radio transceivers 50, 58 may also be connected to ground.

To design an efficient antenna according to antenna theory, the length of the antenna is typically one fourth, one half, or one whole wavelength of the frequency of operation. For example, at a Bluetooth or Wi-Fi frequency of about 2.4 GHz, the wavelength is about 120 mm. At an NFC frequency of about 13.56 MHz, the wavelength is about 22 m (i.e., 22,000 mm). Other similar wavelengths may be applicable at other Bluetooth frequencies (e.g., about 2.4000 GHz to about 2.4835 GHz) or at other NFC frequencies (e.g., about 12.66 MHz to about 14.46 MHz).

Rings typically vary in diameter from about 12 mm to about 22 mm and typically vary in internal circumference from about 49 mm to about 72 mm. Even the largest ring sizes are well below the typically minimum required diameter dimension of one-fourth of the wavelength (i.e., 120 mm/4=30 mm at Bluetooth frequency). Even if the entire ring is used for antenna volume it still would not be enough. This does not even include all the other parts, like battery, photo diode sensors, RF board, chips, etc.

Typical designs on the market use chip antennas that are a few mm by a few mm in size, but which require dedicated antenna volume that is already scarce. In addition, chip antennas have low performance as they typically rely on PCB ground currents that are weak in ring size (e.g., due to the small size of the PCB itself). Nevertheless, the configuration of the first and second antenna components 26, 28 as described with respect to the embodiments of the present disclosure allows the circumference dimension to be utilized in a specific way to enable operation in both frequency bands. Operation is contemplated in both frequency bands simultaneously. For example, the NFC band could be used for charging while the Bluetooth band is used for accessing another Bluetooth device, e.g., a phone. Another example can include using the ring for payment (NFC) while maintaining a connection to a phone (Bluetooth).

Therefore, according to various implementations of the present disclosure, antenna systems and antenna circuits are provided. In one example, an antenna system may include the first antenna component 26 having a first end portion 34 and a second end portion 38 and the second antenna component 28 having a first end portion 36 and a second end 40. The antenna system may also include the first electrical circuit 30 connecting the first end portion 34 of the first antenna component 26 with the first end portion 36 of the second antenna component 28 and a second electrical circuit 32 connecting the second end portion 38 of the first antenna component 26 with the second end portion 40 of the second antenna component 28. In response to the first and second electrical circuits 30, 32 being configured in a first state, the first antenna component 26 and second antenna component 28 are configured to operate within a first frequency band (e.g., Bluetooth). In response to the first and second electrical circuits 30, 32 being configured in a second state, the first antenna component 26 and second antenna component 28 are configured to operate within a second frequency band (e.g., NFC).

Also, in response to the first and second electrical circuits 30, 32 being configured in the first state, the first antenna component 26 and second antenna component 28 are configured in a dipole antenna arrangement (e.g., when the inductor 30 acts as an open circuit). In response to the first and second electrical circuits 30, 32 being configured in the second state, the first antenna component 26 and second antenna component 28 are configured in a loop antenna arrangement (e.g., when the inductor 30 acts as a short circuit). According to some embodiments, the antenna system may be incorporated in a wearable device, such as a ring or smart ring 12, which may be worn on a finger of the wearer. The ring 12 may include an outer shell (e.g., metallic layer 24) having characteristics configured for parasitic reflection of transmission signals.

According to some embodiments, operation within the first frequency band may enable pairing with a smart phone (e.g., mobile device 16) and operation within the second frequency band enable pairing with a Point of Sale (POS) device (e.g., POS machine 18). The antenna system may further include a battery configured to power one or more of the first and second electrical circuits 26, 28. The battery may include an outer metal casing that forms at least a portion of the first antenna component 26. The antenna system may also include a Near-Field Communication (NFC) charger (described with respect to FIGS. 17-19). The NFC charger may be configured to create a magnetic field for charging the battery. The first frequency band may include one or more channels in a Bluetooth frequency band ranging from about 2.4000 GHz to about 2.4835 GHz and the second frequency band may include one or more channels in a Near-Field Communication (NFC) frequency band ranging from about 12.66 MHz to about 14.46 MHz.

The second antenna component 28 may include at least a Flexible Printed Circuit (FPC) or FPC board on which at least a portion of the second electrical circuit 28 resides. The first electrical circuit 30 may include a choke inductor that behaves like an open circuit when operating within the first frequency band and behaves like a short circuit when operating within the second frequency band. The second electrical circuit 32 may include blocking elements 46, 52, matching circuit elements 48, 54, and transceiver elements 50, 58 to enable operation within either the first frequency band or second frequency band. Also, according to embodiments described with respect to FIGS. 15 and 16, the antenna system may further include one or more conductive strips and/or one or more ferrite strips attached to one or more of the first and second antenna components 26, 28.

In operation, the smart ring 12 uses the metal jacket or casing on the battery as part of the first antenna component 26 and can therefore serve as one of the arms of a dipole-like antenna, radiator, or transceiver. When the first electrical circuit 30 is shorted, the battery casing can serve as part of a current path for a loop antenna including both antenna components 26, 28. The battery can also serve as the ground plane of the antenna. In some embodiments, a thin metallic film (e.g., copper tape) can be installed along an outside surface of the battery (e.g., as described below with respect to FIGS. 15 and 16).

The antenna may include, at least partially, one or more traces on the FPC board or PCB (i.e., flexible or rigid boards). Other parts of the antenna may include, at least partially, the metallization on the outside of the battery (e.g., battery case). A ground plane of the FPC may be the actual radiating element of the antenna, (e.g., no separate trace for the antenna element). Various techniques may be applied to protect the electronics from potentials that might be induced in the ground plane, disrupting their operation.

For the higher-frequency (Bluetooth) operation, the antenna has a dipole arrangement, but for the lower-frequency (NFC) operation, the antenna has a loop arrangement. The dipole can approximate a half wave dipole considering loading and tuning. The creation of either the dipole or loop arrangement can be determined by the state of the choke inductor 30. Also, the choke inductor 30 enables the antenna circuit to include higher-frequency or lower-frequency arrangements that can be tuned independently.

The metallic layer 24 of the smart ring 12 can be a parasitic element with a predetermined thickness. Also, the smart ring 12 may include a gap 42 between the metallic layer 24 and the first and second antenna components 26, 28. The gap 42 may have a predetermined width that can be designed to control the parasitic characteristics of the metallic layer 24.

The second electrical circuit 32 may include the capacitor 46 configured for isolation to protect the higher frequencies from the lower frequencies. Also, isolation by the inductor 52 can protect the lower frequency (NFC) circuits from the higher frequency signals.

Figure 4:
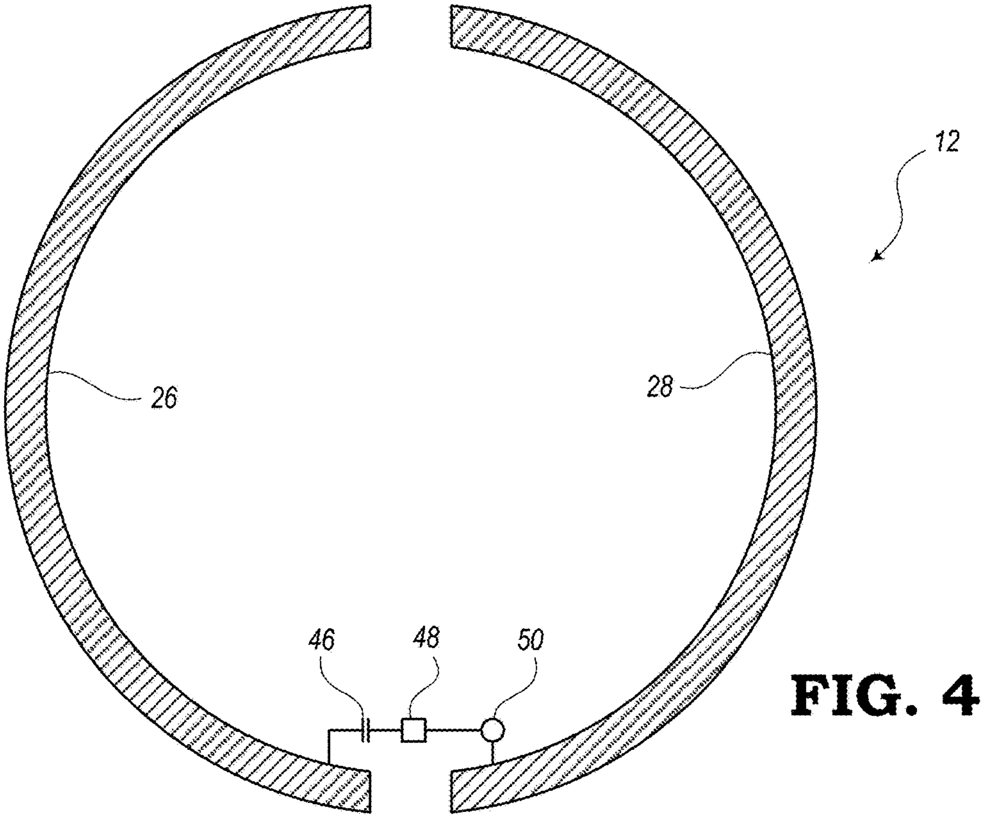
FIG. 4 is a diagram illustrating operation of the smart ring of FIG. 2 within a first frequency band, according to various embodiments.

FIG. 4 is a diagram illustrating operation of the smart ring 12 within a first (higher) frequency band, according to some embodiments. In the higher frequency operation (e.g., frequency band of about 2.0 GHz to about 2.4 GHz), the choke inductors 30, 52 are "open." As a result, the antenna circuitry (e.g., first and second antenna components 26, 28) effectively become a folded dipole device where a first arm includes the first antenna component 26 and a second arm includes the second antenna component 28. Also, the bottom portion of the second electrical circuit 32, which includes the components 52, 54, 56, 58, are essentially isolated as a result of the inductor 52 acting as an open circuit. Again, the first antenna component 26 may include the battery and/or battery casing and the second antenna component 28 may include the FPC, surrounded by the parasitic element (e.g., metallic layer 24, not shown in FIG. 4).

In the arrangement of FIG. 4, the smart ring 12 is configured for higher frequency (e.g., Bluetooth) operation. Accordingly, the applicable wavelengths (e.g., carrier frequency wavelengths) may be about 120 mm at a frequency of about 2.4 GHz. The ring circumference may typically be about 50-70 mm, which is in neighborhood of a half wavelength. The battery casing and FPC can be about 25-35 mm long, which is in the neighborhood of a quarter wavelength. High frequency matching and chokes can be used to offset for embodiments in which the dipole arms are not exactly a quarter wavelength. At high frequency, the chokes are "open," and a folded dipole antenna structure is created.

Figure 5:
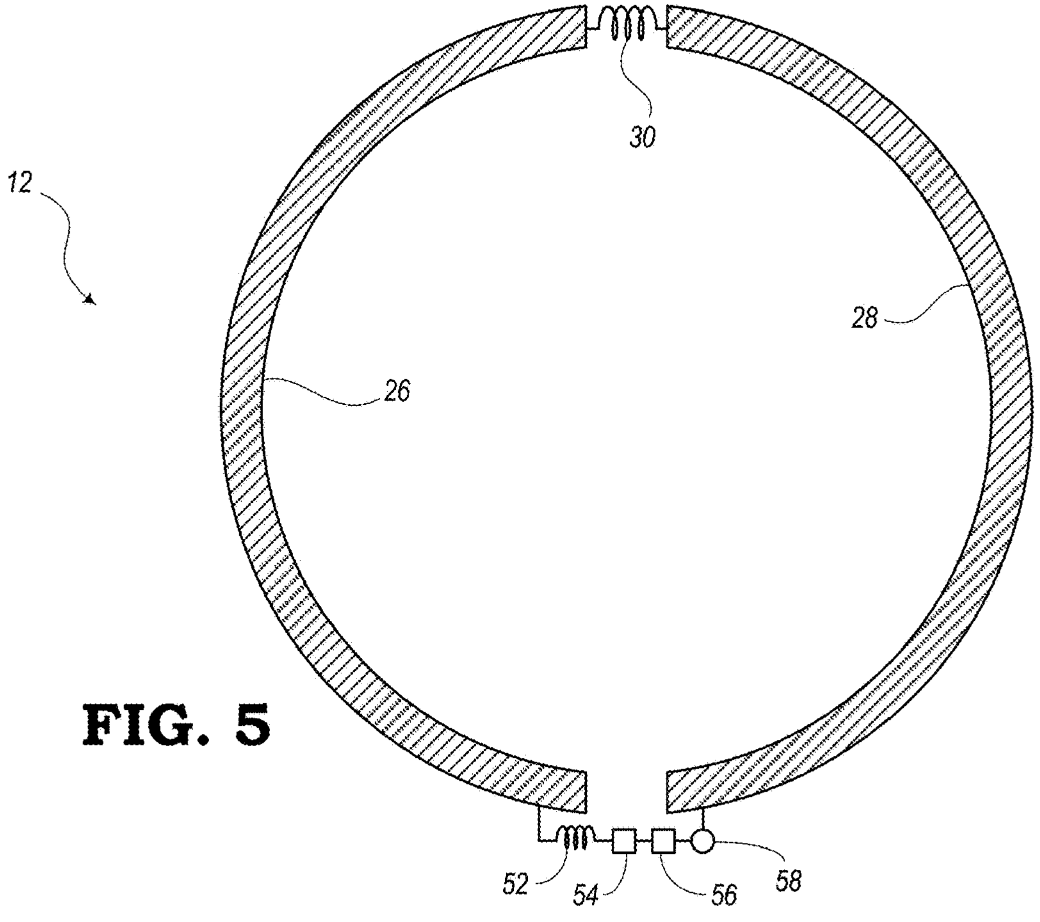
FIG. 5 is a diagram illustrating operation of the smart ring of FIG. 2 within a second frequency band, according to various embodiments.

FIG. 5 is a diagram illustrating operation of the smart ring 12 within the second (lower) frequency band. In the lower frequency band (e.g., NFC, about 13.56 MHz), the capacitor 46 (e.g., NFC blocker) is "open" and the antenna circuit effectively becomes a loop antenna made up of the battery or battery casing (e.g., first antenna component 26) and the FPC (e.g., second antenna component 28). Also, the inductor 30 may act essentially like a short circuit at the lower frequencies. The loop antenna is surrounded by parasitic element (e.g., metallic layer 24, not shown in FIG. 5).

Figure 6:
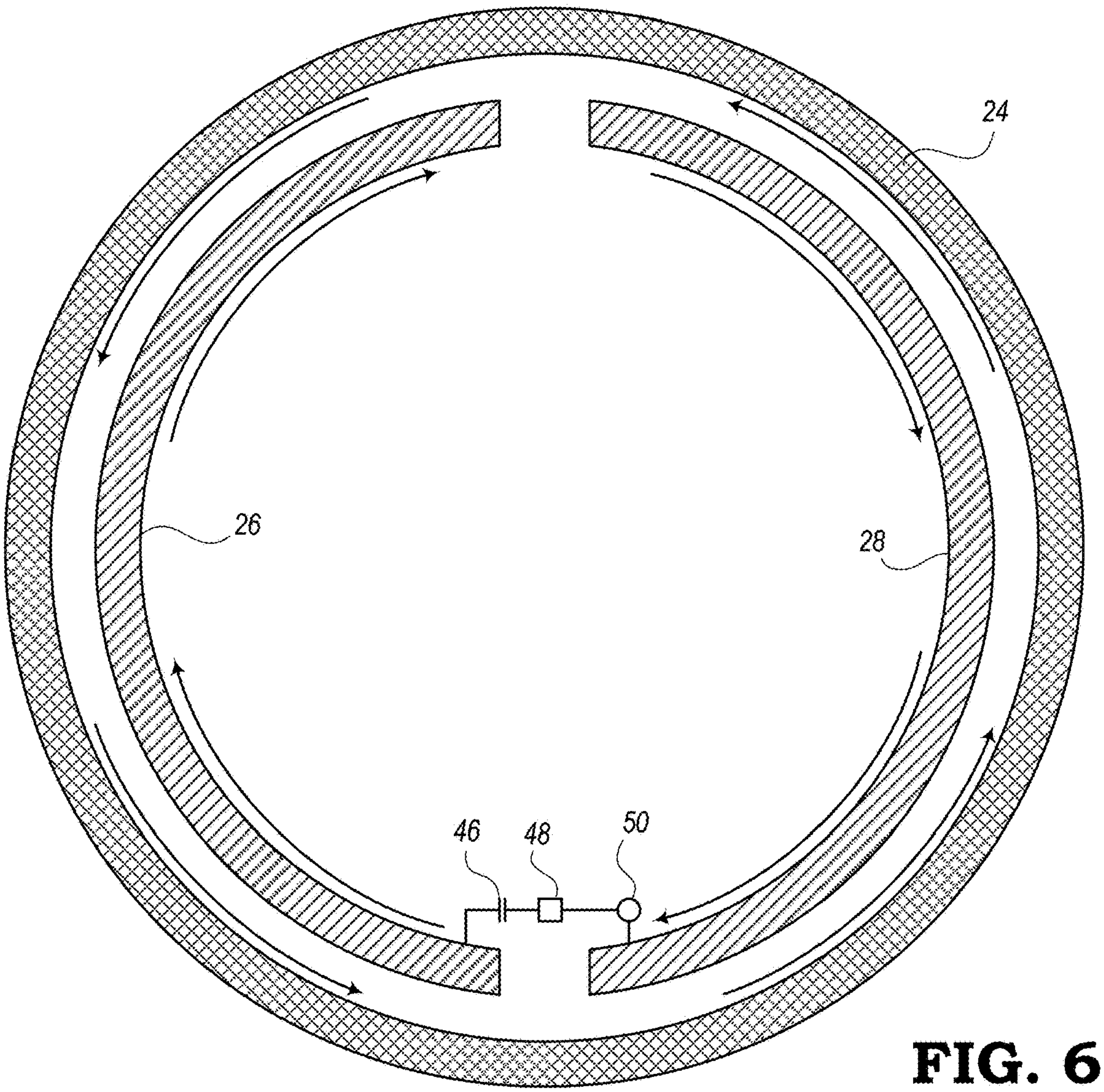
FIG. 6 is a diagram illustrating currents in a dipole antenna arrangement with parasitic currents, according to various embodiments.
Figure 7:
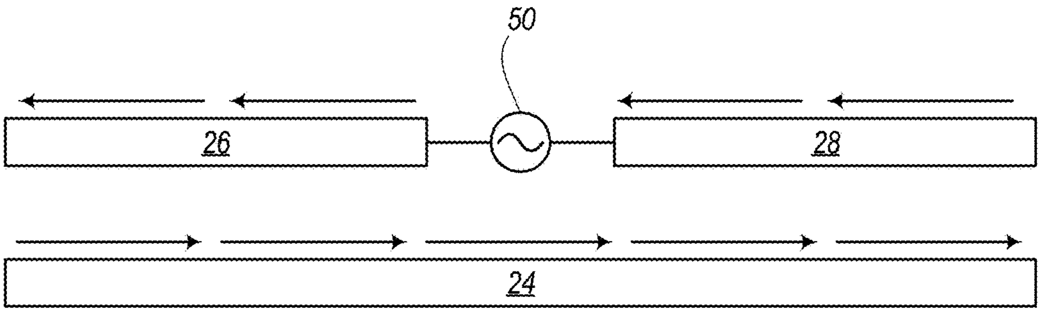
FIG. 7 is a diagram illustrating currents in the dipole antenna arrangement shown in FIG. 6 with the antenna elements laid out linearly, according to various embodiments.

FIG. 6 is a diagram illustrating currents in the dipole antenna arrangement as shown in FIG. 4. Also, parasitic currents through the metallic layer 24 are shown. FIG. 7 is a diagram illustrating currents in the dipole antenna arrangement, where the antenna elements are laid out linearly.

Figure 8:
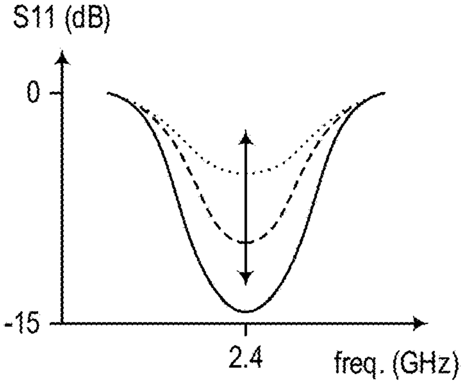
FIG. 8 is a graph illustrating the scattering parameter (S parameter) of S11 versus frequency of a matching circuit for use in the higher frequency band, according to various embodiments.
Figure 9:
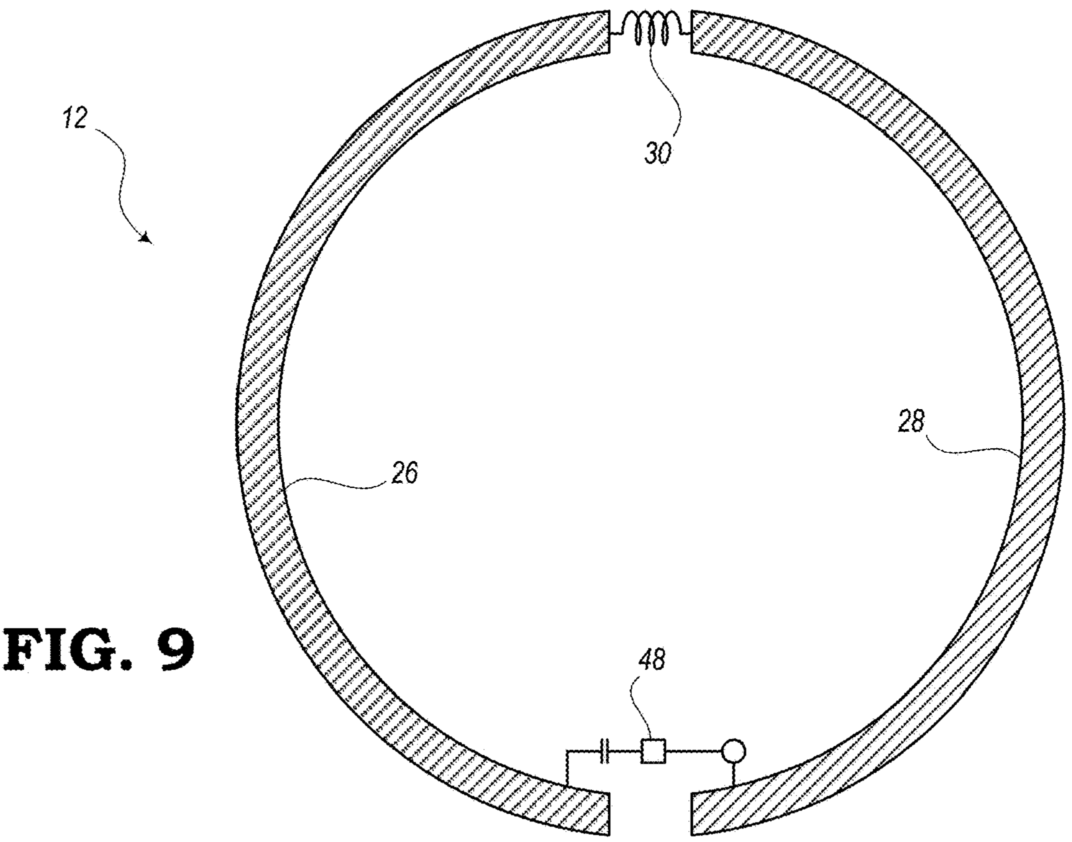
FIG. 9 is a diagram illustrating operation of the smart ring of FIG. 2, according to various embodiments.
Figure 10:
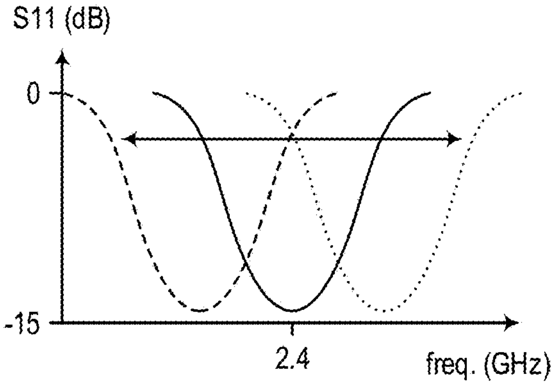
FIG. 10 is a graph illustrating the S parameter S11 versus frequency of a choke inductor for use in the higher frequency band, according to various embodiments.

FIG. 8 is a graph illustrating the scattering parameter (S parameter) of S11 versus frequency of the matching circuit 48, as shown in FIGS. 3 and 9, for use in the higher frequency band. Inductance may be on the order of nH and capacitance may be on the order of pF. The term S11 may represent the input port voltage reflection coefficient of the scattering parameter matrix. FIG. 10 is a graph illustrating the S parameter S11 versus frequency of a choke inductor (e.g., inductor 30 shown in FIGS. 2, 3, and 9) for use in the higher frequency band. The inductor 30 may include an inductance on the order of μH. For the matching circuit 48, the inductance may be on the order of nH and the capacitors may have a capacitance on the order of pF.

Figure 11:
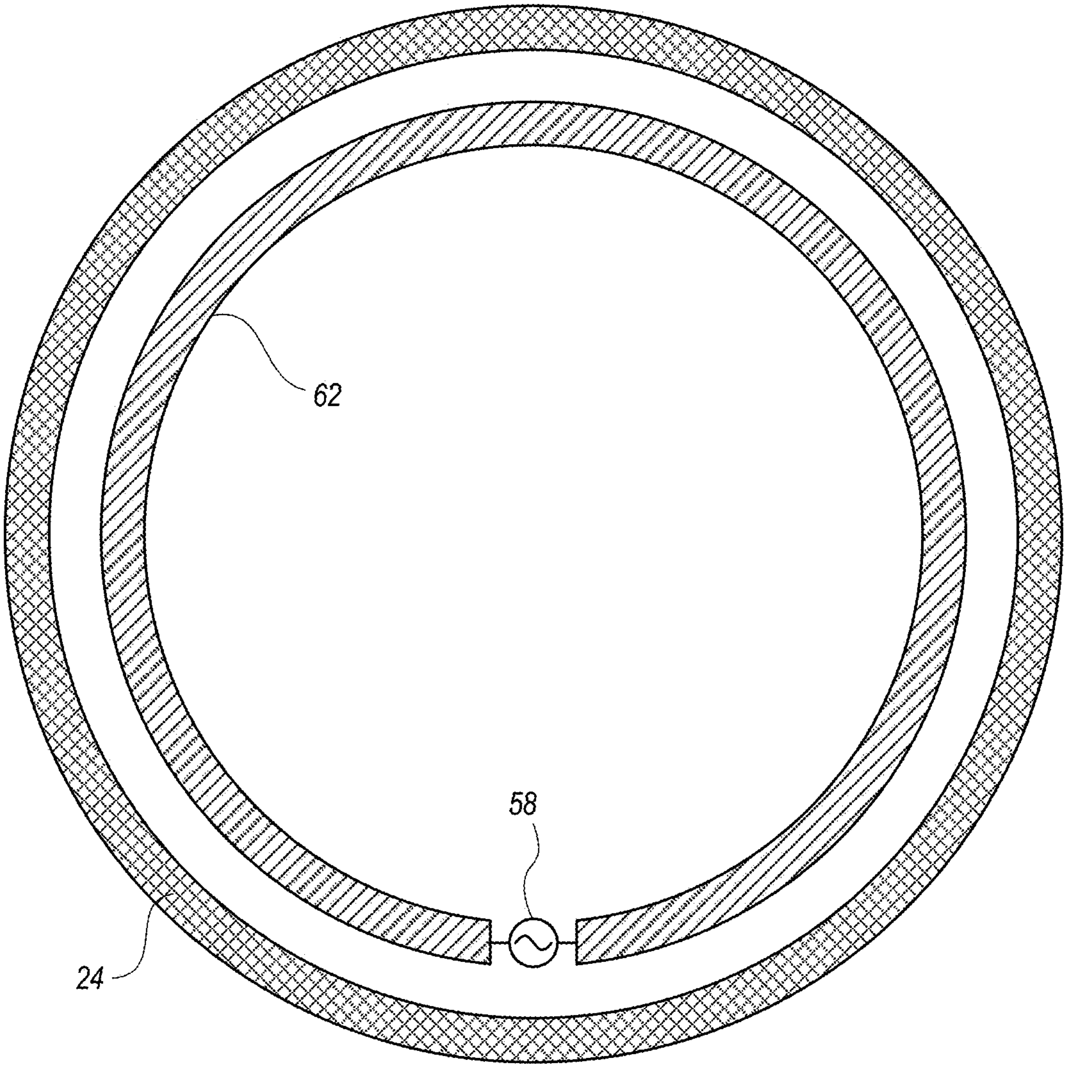
FIG. 11 is a diagram illustrating operation of the smart ring of FIG. 2 for operation in the second frequency band, according to various embodiments.

FIG. 11 is a diagram illustrating operation of the smart ring 12 for operation in the second (lower) frequency band when configured as a loop antenna 62 as shown in FIG. 5. The lower (NFC) band allows the smart ring 12 to operate at about 13.56 MHz, plus or minus about 0.9 MHz and utilizing the transceiver 58. In the NFC band, the wavelength is about 22 m (i.e., 22,000 mm). The battery (e.g., first antenna component 26) and the FPC (e.g., second antenna component 28) are effectively connected through the higher frequency choke (e.g., inductor 30) at about 13.56 MHz. The lower frequency antenna may have low resistance and high inductance in the loop (e.g., about 0.1 to about 3.0 micro Henries (μH)). The other higher frequency choke (e.g., inductor 52) in addition to the inductor 30 can also be used to offset a lack of inductance in the loop 62.

Figure 12:
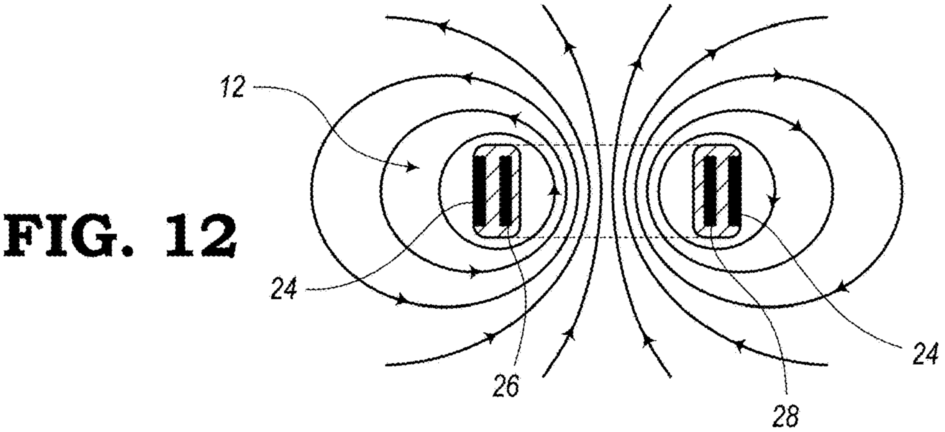
FIG. 12 is a diagram illustrating a side cross-sectional view of the smart ring of FIG. 2 and corresponding magnetic field lines, according to various embodiments.

FIG. 12 is a cross-sectional view of the smart ring 12 from a side perspective, where the smart ring 12 extends orthogonally with respect to the page. In this embodiment, the metallic layer 24 is shown only at an outer portion of the smart ring 12, but, in other embodiments, the metallic layer 24 may extend around the entire periphery of the ring surface or partially around the periphery. FIG. 12 also shows a cross section of the first antenna component 26 (e.g., battery casing) and a cross section of the second antenna component 28 (e.g., FPC). Although the cross section of the first and second antenna components 26, 28 are shown as being rectangular, it should be understood that they may include any suitable shape for operation within the range of different sizes and configurations of various rings. Also shown in FIG. 12 are corresponding magnetic field lines based on radiation patterns of the transceivers 50, 58.

Figure 13:
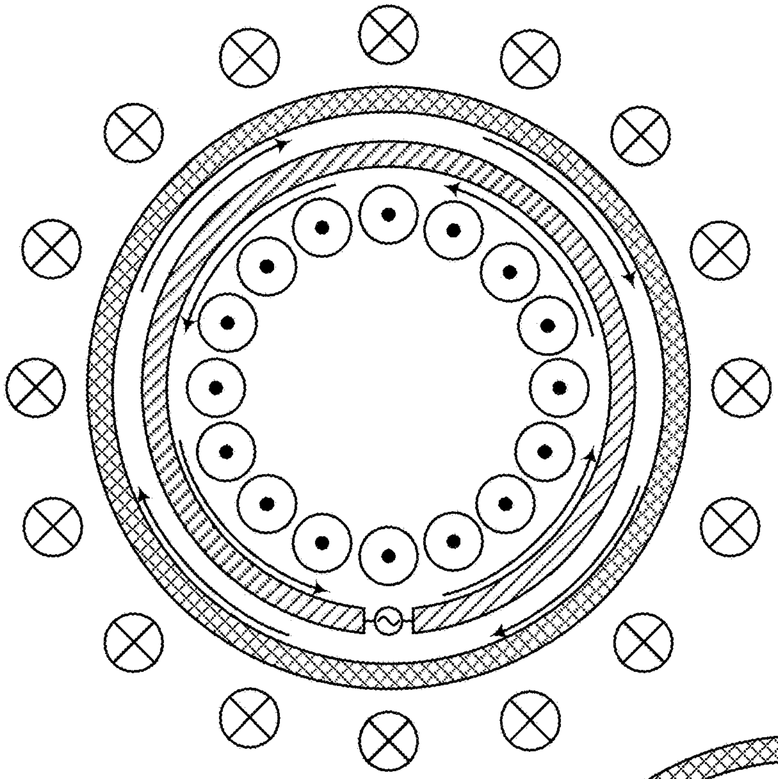
FIG. 13 is a diagram illustrating a cross-sectional view of the smart ring of FIG. 2 and corresponding magnetic fields, according to various embodiments.

FIG. 13 is a cross-sectional view of the smart ring 12 from a top perspective, where the smart ring 12 is parallel to the page and the magnetic field lines extend orthogonally with respect to the page. For example, the circles with dots represent a direction of the magnetic field coming out of the page and circles with Xs represent a direction of the magnetic field going into the page. Also, the arrows in the counter-clockwise direction represent the direction of current in the loop antenna, while arrows in the clockwise direction represent the direction of parasitic current in the metallic layer 24.

Figure 14:
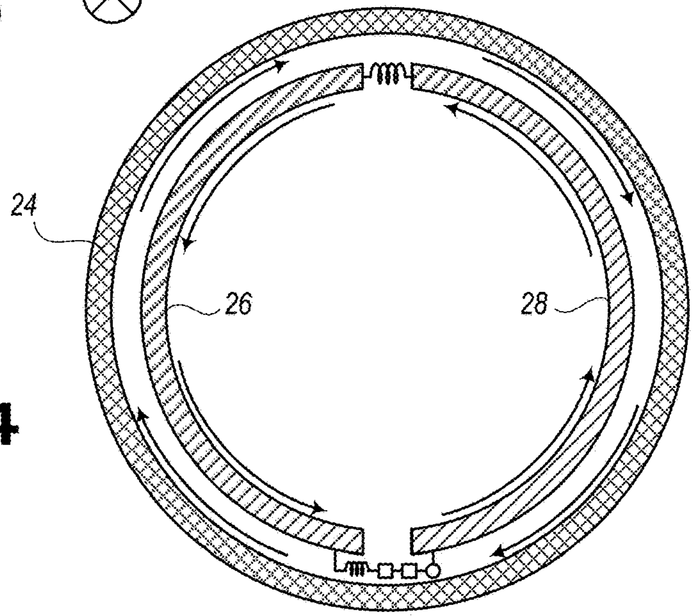
FIG. 14 is a diagram illustrating currents in a loop antenna arrangement with parasitic currents, according to various embodiments.

FIG. 14 also shows the currents in a loop antenna arrangement with the parasitic currents. In the lower frequency arrangement (e.g., about 13.56 MHz), the NFC blocking element 46 (e.g., capacitor) is "open" and the loop antenna is effectively formed by the first and second antenna components 26, 28, surrounded by the parasitic element of the metallic layer 24.

Figure 15:
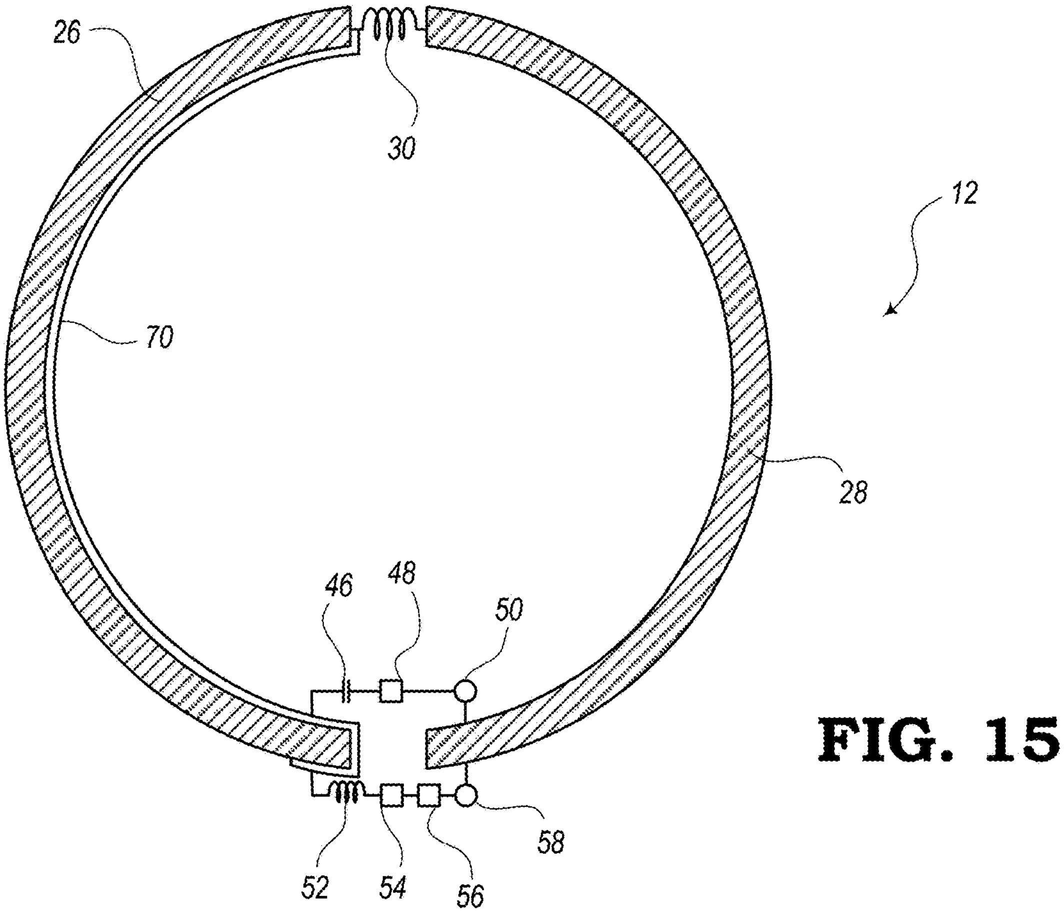
FIG. 15 is a diagram illustrating the smart ring of FIG. 2 with a strip of conductor film formed on one surface of a battery casing, according to various embodiments.

FIG. 15 is a diagram illustrating an embodiment of the smart ring 12, which may further include a strip of conductor film 70 formed on one surface (e.g., inner surface) of the first antenna component 26 (e.g., battery casing). In this embodiment, the battery jacket may be at least partially conductive and the conductor film 70 may be used as a conductor for providing more predictable antenna properties, such as improving conductivity, reducing resistance, etc. Also, the conductor film 70 may be added over the first antenna component 26 from the first electrical circuit 30 to the high frequency choke inductor element 52.

Figure 16:
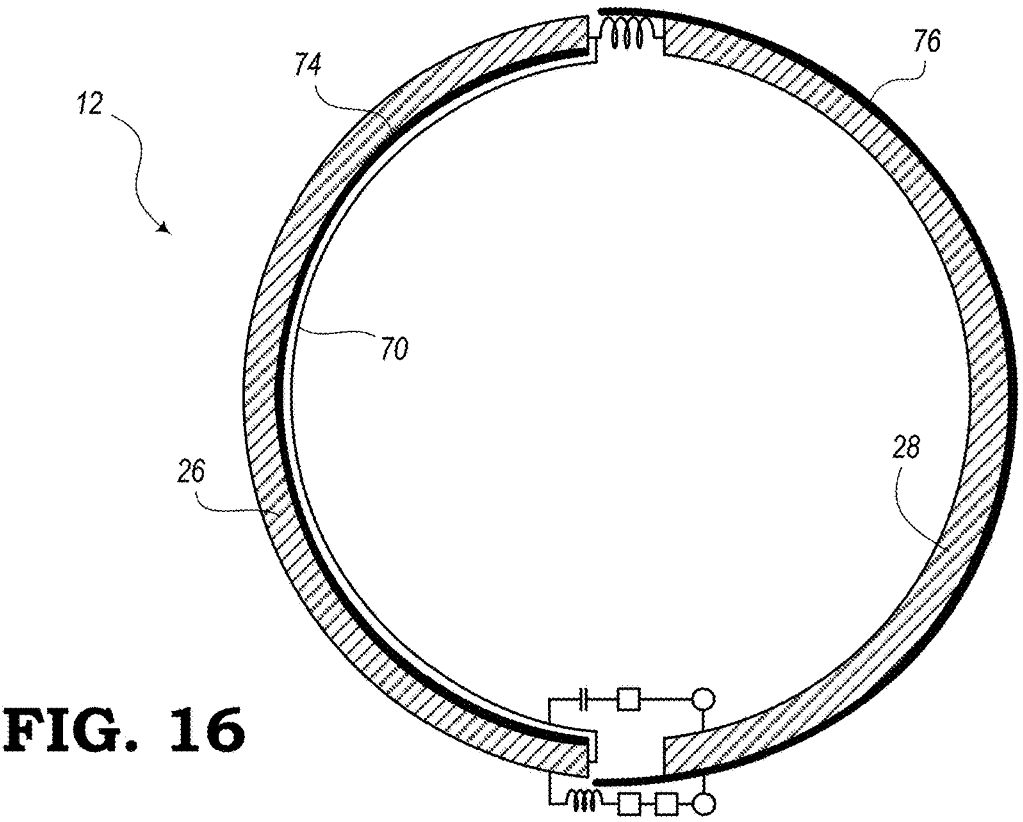
FIG. 16 is a diagram illustrating the smart ring of FIG. 2 with the strip of conductor film of FIG. 15 and strips of ferrite sheets formed on surfaces of the battery casing and a Flexible Printed Circuit (FPC), according to various embodiments.

FIG. 16 is a diagram illustrating another embodiment of the smart ring 12, which may further include first and second strips of ferrite sheets 74, 76, in addition to the strip of conductor film 70 shown in FIG. 15. The first strip of ferrite sheet 74 may be formed on a surface (e.g., inner surface) of the first antenna component 26 (e.g., battery casing), which may then be surrounded by the conductor film 70 in some embodiments. The second strip of ferrite sheet 76 may be formed on a surface (e.g., an outer surface) of the second antenna component 28 (e.g., FPC), such as between the metallic layer 24 and the FPC. If NFC antenna efficacy needs to be increased, one or more of the ferrite sheets 74, 76 can be placed on one or more of the first and second antenna components 26, 28.

Figure 17:
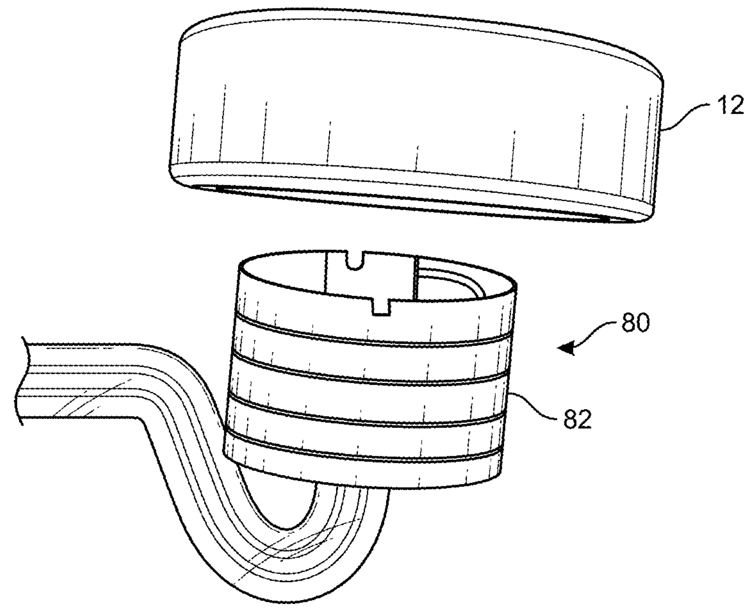
FIG. 17 is a photograph illustrating a side view of a Near-Field Communications (NFC) charger for charging the smart ring of FIG. 2, according to various embodiments.
Figure 18:
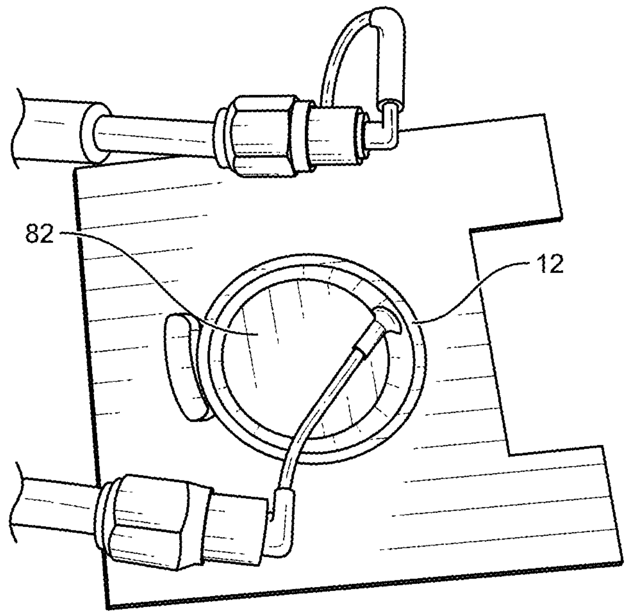
FIG. 18 is a photograph illustrating a top view of the NFC charger of FIG. 17, according to various embodiments.

FIG. 17 is a photograph showing a perspective side view of a Near-Field Communications (NFC) charger 80 configured for charging the smart ring 12 when place in proximity thereto. FIG. 18 is a photograph illustrating a top view of the NFC charger 80. The NFC charger 80 may include a coil 82, which may be embedded in a tubular post. When the smart ring 12 is placed over the post, NFC charger 80 is configured to cause the coil 82 to generate a magnetic field (e.g., similar to the magnetic field shown in FIG. 13). This magnetic field may be used to charge the battery of the smart ring 12.

The charger 80 induces currents in the antenna components 26, 28 that are larger than the currents that already exist in the smart ring 12. The additional of the ferrite sheets 74, 76 (FIG. 16) between the inner antenna component and the outer metallic layer 24 can be used to improve the performance of the NFC antenna (e.g., which may be possible at some expense of the performance at the higher frequency implementations). The smart ring 12 can be placed on the NFC charger 80 for charging. Since the smart ring 12 may be rotationally independent, it can be placed in any rotational or up/down position. Charging the NFC antenna component's magnetic field is configured to couple with the ring's magnetic field.

Figure 19:
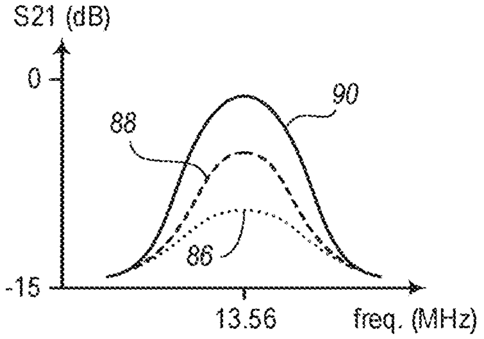
FIG. 19 is a graph illustrating the S parameter of S21 versus frequency of the NFC charger for operation within the second frequency band, according to various embodiments.

FIG. 19 is a graph illustrating S21 (e.g., S parameter related to forward voltage gain) versus frequency of the NFC charger 80 for operation within the second (lower) frequency band. The curve 86 may represent the response based on the configuration shown in FIG. 5. The curve 88 may represent the response based on the configuration shown in FIG. 15 with the strip of conductor film 70 added. Also, the curve 90 may represent the response based on the configuration shown in FIG. 16 with the conductor film 70 and ferrite sheets 74, 76 added. All three implementations work well for NFC payment applications with a suitable POS device. Also, all three implementations work well for wireless charging applications. The power transfer function from the charger 80 to the smart ring 12 (and vice versa) may include scattering parameters or S parameters (S11, S21, S12, S22), where S21 is shown in the graph of FIG. 19.

Figure 20:
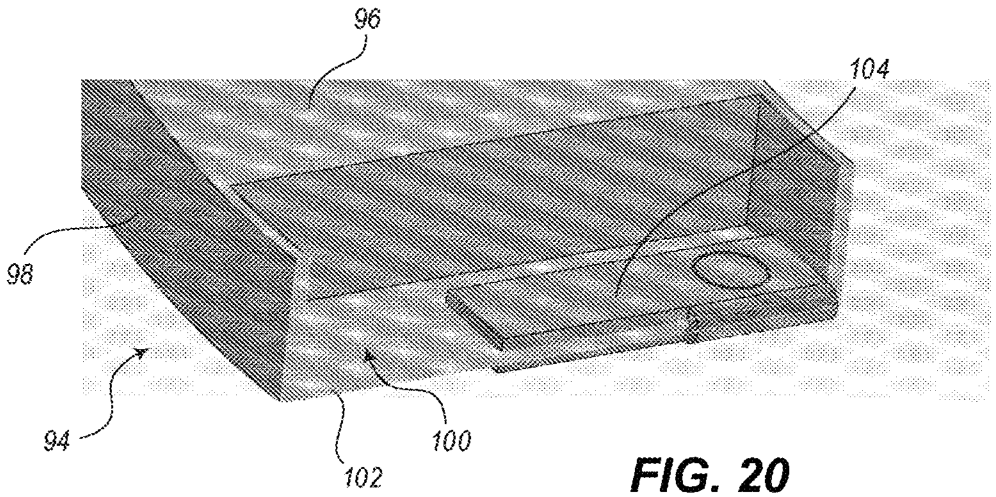
FIG. 20 is a diagram illustrating an end portion of a battery casing used as one antenna element, according to various embodiments.
Figure 21:
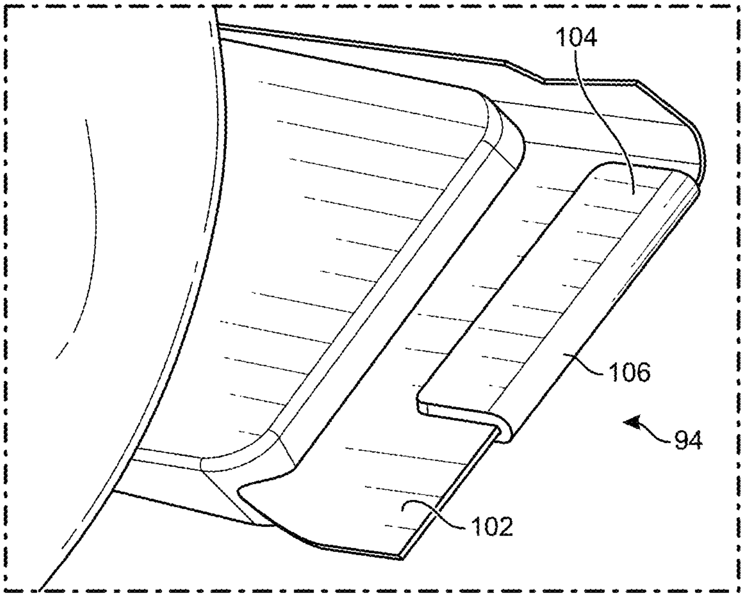
FIG. 21 is a photograph illustrating the end portion of the battery casing of FIG. 20, according to various embodiments.

FIG. 20 is a diagram illustrating a perspective view of an end portion of a battery casing 94, which may be used as the first antenna component 26. In this view, FIG. 20 shows the battery casing 94 with an inner surface 96 (facing away from the metallic layer 24 within the smart ring 12) and a side portion 98 facing a top (or bottom) end of the smart ring 12. FIG. 21 is a photograph illustrating the end portion of the battery casing 94. In this embodiment, the battery casing 94 also includes a pouch 100 and an edge 102 (of the pouch 100 or battery casing 94). A metal clip 104 may be attached over at least a portion of the edge 102. The metal clip 104 can be attached by crimping the material over the edge 102, by soldering 106, and/or by other suitable ways to ensure a sufficient conductive contact.

Figure 22:
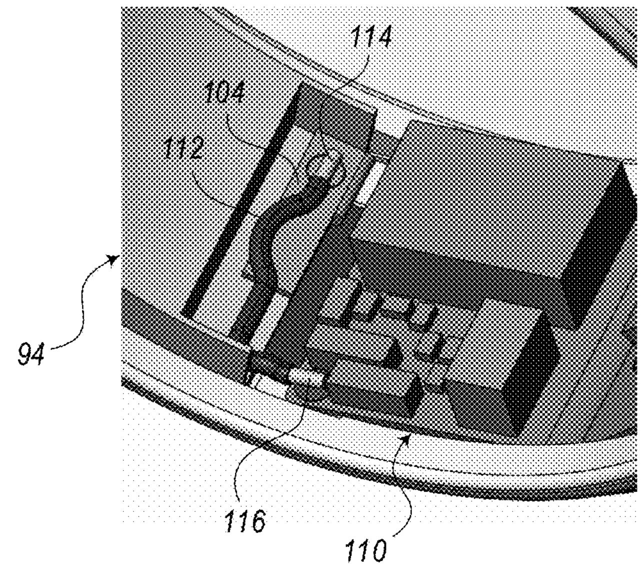
FIGS. 22-24 are diagrams illustrating connections between the battery casing of FIG. 20 and an end portion of a FPC used as another antenna element, according to various embodiments.
Figure 23:
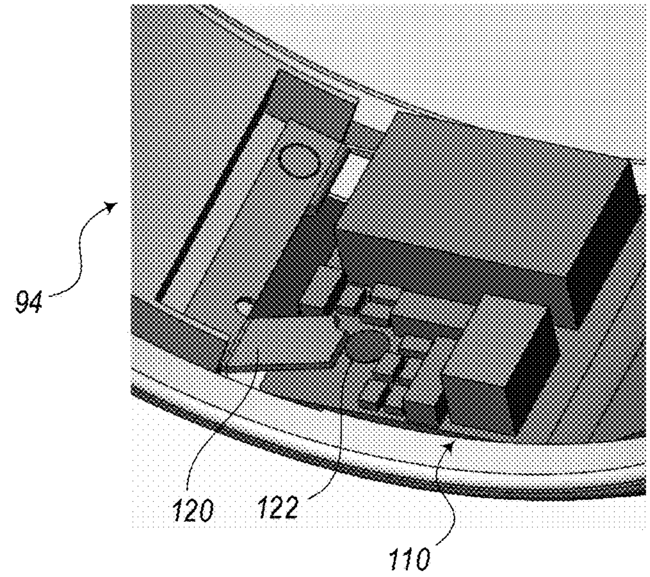
Figure 24:
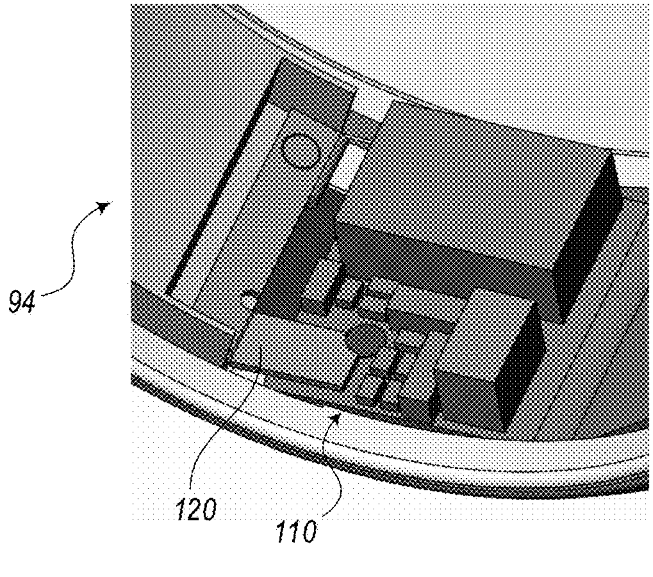

FIGS. 22-24 are diagrams illustrating connections between the battery casing 94 of FIGS. 20 and 21 and an end portion of a FPC 110, which may be used as the second antenna component 28. For example, the FPC 110 may include non-conductive board elements (flexible or rigid) on which electrical circuitry may reside. The electrical circuitry, for instance, may include the higher frequency elements 46, 48, 50 and the lower frequency elements 52, 54, 56, 58 shown in FIG. 3. In this respect, the electrical connection between the first and second antenna components 26, 28 may include the second electrical circuit 32, which may be housed on the FPC 110.

The connection between the battery casing 94 (or jacket) and the FPC 110 may include soldering ends of a wire 112 as shown in FIG. 22. A first end 114 of the wire 112 may be soldered to the metal clip 104 in the pouch 100 of the battery casing 94 and a second end 116 of the wire 112 may be soldered to a contact on the FPC 110. In some cases, a clip 120 (FIG. 23) may be soldered in place on the battery casing 94 and then used to force fit (e.g., pinch) a conductive contact 122 on the FPC 110 (FIG. 24).

Figure 25:
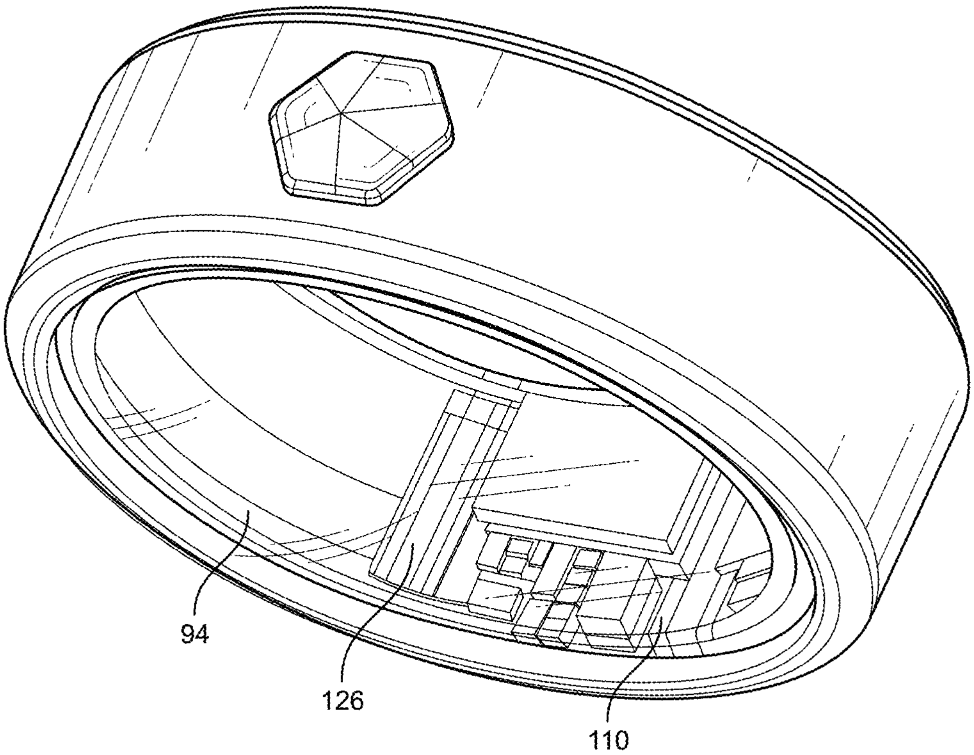
FIG. 25 is a diagram illustrating an isometric, partially cut-away view of the smart ring of FIG. 2, according to various embodiments.
Figure 26:
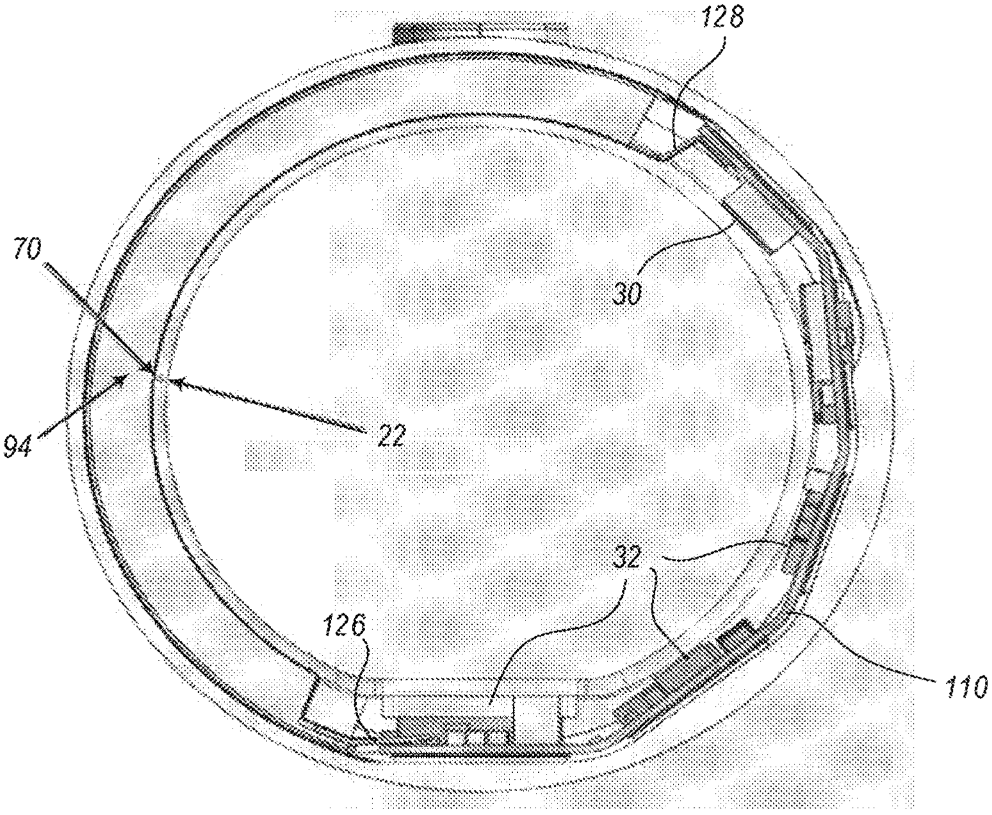
FIG. 26 is a diagram illustrating a cross-section side view of the smart ring of FIG. 2, according to various embodiments.

FIG. 25 is a diagram illustrating an isometric, partially cut-away view of the smart ring 12. Also, FIG. 26 is a diagram illustrating a cross-sectional view of the smart ring 12. The battery casing 94 is embedded in the smart ring 12 and is connected via a first set of connections 126 (e.g., one of the connection implementations described with respect to FIGS. 22-24) to the second electrical circuit 32 formed on the FPC 110. A second set of connections 128 is formed between the other end of the battery casing 94 and the other end of the FPC 110 and is used for connection to the first electrical circuit 30, which may also be formed on the FPC 110.

Figure 27:
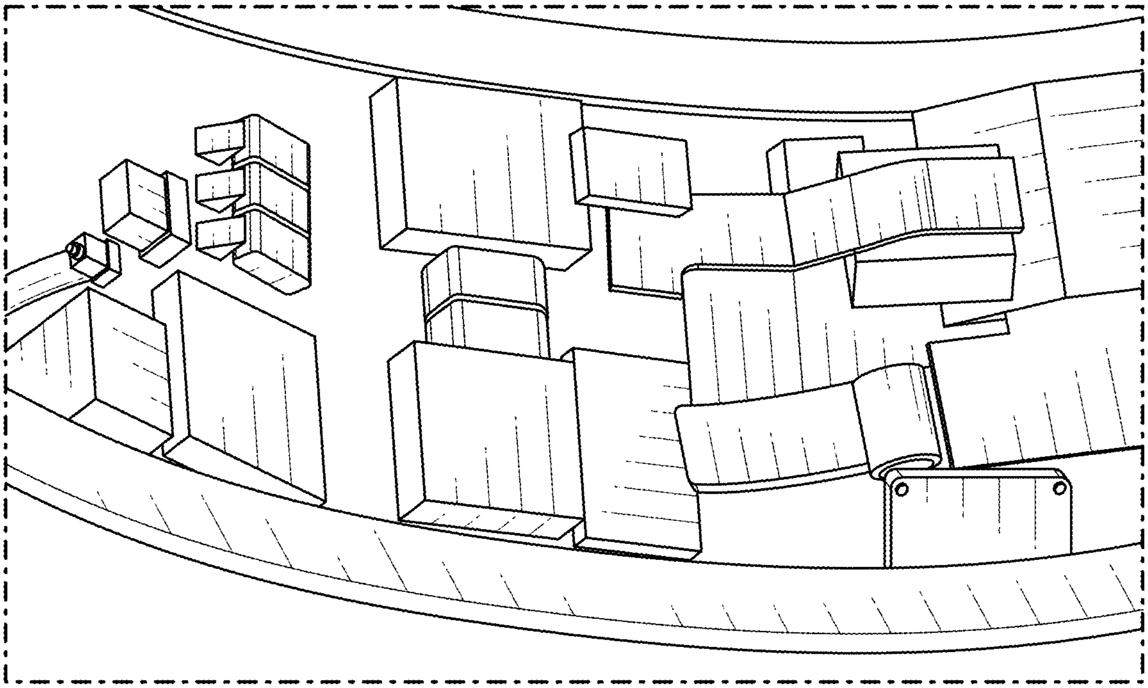
FIG. 27 is a photograph illustrating connections from positive and negative terminals of a battery to another end portion of the FPC, according to various embodiments.

FIG. 27 is a photograph illustrating connections (e.g., second set of connections 128) from positive and negative terminals of a battery (e.g., protected by the battery casing 94) to the other end portion of the FPC 110. Using the positive (+) and negative (−) battery leads the natural capacitance, the connections 128 are configured for electrical contact between the battery (and/or battery case) and the FPC 110 to complete the circuit through the high frequency choke inductor 30. In some embodiments, a clip may be used at both ends of the battery to achieve the connection.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A wearable ring comprising:

an inner surface and an outer surface;

a first antenna component and a second antenna component, each disposed between the inner surface and the outer surface of the wearable ring, the first antenna component being configured in a shape to fit within a portion of a shape of the wearable ring, the second antenna component being configured in a shape to fit within another portion of the wearable ring;

a first electrical circuit connecting a first end portion of the first antenna component with a first end portion of the second antenna component; and a second electrical circuit connecting a second end portion of the first antenna component with a second end portion of the second antenna component, wherein, based on configuration of the first electrical circuit and the second electrical circuit, the first antenna component and second antenna component are configured to operate in a given frequency band.

2. The wearable ring of claim 1, wherein the given frequency band is one of a first frequency band and a second frequency band.

3. The wearable ring of claim 2, wherein operation within the first frequency band enables pairing with a user device and operation within the second frequency band enables pairing with a Point of Sale (POS) device.

4. The wearable ring of claim 2, wherein the first frequency band includes one or more channels in a Bluetooth frequency band ranging from about 2.4000 GHz to about 2.4835 GHz and the second frequency band includes one or more channels in a Near-Field Communication (NFC) frequency band ranging from about 12.66 MHz to about 14.46 MHz.

5. The wearable ring of claim 1, wherein the configuration includes one of a dipole antenna arrangement and a loop antenna arrangement.

6. The wearable ring of claim 5, wherein the dipole antenna arrangement is for Bluetooth and the loop antenna arrangement is for Near-Field Communication (NFC).

7. The wearable ring of claim 1, wherein the outer surface includes an outer shell having characteristics configured for parasitic reflection of transmission signals.

8. The wearable ring of claim 1, further comprising:

a battery configured to power one or more of the first and second electrical circuits, wherein the battery includes an outer metal casing that forms at least a portion of the first antenna component.

9. The wearable ring of claim 8, further comprising:

a Near-Field Communication (NFC) charger configured to create a magnetic field for charging the battery.

10. The wearable ring of claim 8, wherein the battery serves as one of more of a ground plane, one of arms for a dipole antenna arrangement, and a current path for a loop antenna arrangement.

11. The wearable ring of claim 1, wherein the second antenna component includes at least a flexible printed circuit board on which at least a portion of the second electrical circuit resides.

12. The wearable ring of claim 1, wherein the second electrical circuit includes blocking elements, matching circuit elements, and transceiver elements to enable operation within either a first frequency band or a second frequency band.

13. The wearable ring of claim 1, wherein the first electrical circuit includes a choke inductor that behaves like an open circuit when operating within a first frequency band and behaves like a short circuit when operating within a second frequency band.

14. The wearable ring of claim 1, further comprising one or more of a conductive strip and a ferrite strip attached to one or more of the first and second antenna component.

* * * * *